ELECTRIC ANALOG COMPUTOR AND SIMILAR CIRCUITS

Filed May 4, 1951 7 Sheets-Sheet 1

Inventors:
ETIENNE A.H. HONORÉ
EMILE L.G. TORCHEUX
ROGER D.C. ROY
by: J. Delattre-Seguy
Attorney March 19, 1957 E. A. H. HONORÉ ET AL 2,785,853

ELECTRIC ANALOG COMPUTOR AND SIMILAR CIRCUITS

Filed May 4, 1951 7 Sheets-Sheet 2

Inventors:
ETIENNE A. H. HONORÉ
EMILE L. G. TORCHEUX
ROGER D. C. ROY
by: J Delattre Seguy
Attorney

ELECTRIC ANALOG COMPUTOR AND SIMILAR CIRCUITS

Inventors:
ETIENNE A.H. HONORÉ
EMILE L.G. TORCHEUX
ROGER D.C. ROY
by: J. Delattre-Seguy
Attorney

March 19, 1957 E. A. H. HONORÉ ET AL 2,785,853

ELECTRIC ANALOG COMPUTOR AND SIMILAR CIRCUITS

Filed May 4, 1951 7 Sheets-Sheet 4

Inventors:
ETIENNE A. H. HONORÉ
EMILE L. G. TORCHEUX
ROGER D. C. ROY
by. J. Delattre-Seguy
Attorney March 19, 1957 E. A. H. HONORÉ ET AL 2,785,853

ELECTRIC ANALOG COMPUTOR AND SIMILAR CIRCUITS

Filed May 4, 1951 7 Sheets-Sheet 5

Inventors:
ETIENNE A.H. HONORÉ
EMILE L.G. TORCHEUX
ROGER D.C. ROY
by: J. Delattre-Seguy
Attorney March 19, 1957 E. A. H. HONORÉ ET AL 2,785,853

ELECTRIC ANALOG COMPUTOR AND SIMILAR CIRCUITS

Filed May 4, 1951 7 Sheets-Sheet 6

Inventors:
ETIENNE A. H. HONORÉ
EMILE L. G. TORCHEUX
ROGER D. C. ROY
by: J. Delattre-Seguy
Attorney March 19, 1957 E. A. H. HONORÉ ET AL 2,785,853

ELECTRIC ANALOG COMPUTOR AND SIMILAR CIRCUITS

Filed May 4, 1951 7 Sheets-Sheet 7

Inventors:
ETIENNE A.H. HONORÉ
EMILE L.G. TORCHEUX
ROGER D.C. ROY
by: J. Delattre-Seguy
Attorney

United States Patent Office 2,785,853

Patented Mar. 19, 1957

2,785,853

ELECTRIC ANALOG COMPUTER AND SIMILAR CIRCUITS

Etienne Augustin Henri Honoré and Emile Leon Gabriel Torcheux, Paris, and Roger Desire Camille Roy, St. Cloud, France; Guy G. J. Cordiee-Roy, executor or administrator of said Roy, deceased

Application May 4, 1951, Serial No. 224,518

Claims priority, application France May 6, 1950

18 Claims. (Cl. 235—61)

The present invention relates to electric analog calculators, computors or similar devices.

In known electric analog calculators, the magnitudes on which calculations are to be performed are first converted into voltages, one voltage unit being taken for one unit of the magnitude concerned, for instance one volt for one kilometer. Additions, subtractions, multiplications and divisions are then performed in voltages instead of in lengths.

Such calculators may, for example, be made up of potentiometers or transformers. In this way, for example, such a device may be built up of the combination of three transformers each having two windings, namely a primary and a secondary, wherein one winding of each transformer has variable taps, the windings having variable taps being connected in series, to form a closed circuit. It is known that if voltages $V_1$ and $V_2$ of the same frequency and phase are respectively fed to the windings having no variable taps of two of these three transformers, there is established across the terminals of the output or secondary winding of the third transformer a voltage $V_3$ of the same frequency and about the same phase as the voltages $V_1$ and $V_2$, and that between the three voltages there will exist, broadly speaking, the relation:

$$V_1X_1+V_2X_2+V_3X_3=0$$

in which $X_1$, $X_2$ and $X_3$ are coefficients that depend on the position of the variable taps utilized.

This is merely the expression of Kirchhoff's law: it is obvious that if two voltages $V_1$ and $V_2$ are applied to the primary windings of two transformers having their respective secondary windings series connected with the primary winding of a third transformer, the voltage appearing across the secondary winding of the latter is equal in absolute value to the sum of applied voltages if the respective transformation ratios are equal to 1 and the losses are assumed to be nil. Now, if the direction of the applied voltages $V_1$ and $V_2$ is taken as positive, the direction of $V_3$ is obviously negative. Therefore it may be written that $$V_1+V_2=-V_3 \text{ or } V_1+V_2+V_3=0 \qquad (1a)$$

Obviously if the respective transformation ratios are $X_1$, $X_2$ and $X_3$, this expression may be written as:

$$V_1X_1+V_2X_2+V_3X_3=0$$

It should be noted, however, that this relation is in fact obtained only in a very imperfect way, for the collected voltage $V_3$ depends not only on the applied voltages $V_1$ and $V_2$ and the coefficients $X_1$, $X_2$ and $X_3$, fixed for instance by the variable taps utilized, but also on the intensity of the current flowing in the output winding of the third transformer.

Of course, there may be any number of transformers taking part in such a combination, giving the relation:

$$V_1X_1+ \ldots V_NX_N=0 \qquad (1)$$

It is an object of the present invention to provide an electrical circuit that produces this relation in an almost perfect way.

It is another object of the invention to provide electrical analog computing circuits of the above type for performing with high accuracy addition, subtraction, multiplication and division.

It should be noted that in the following description the word "admittance" will be used herein in the sense of complex admittance. As is known, complex admittance for instance of a circuit comprising in series a resistance R, an inductance L and a capacity C would be:

$$\frac{1}{R+j\left(L\omega-\frac{1}{C\omega}\right)}$$

Consequently, if the admittance of a capacitor is expressed by +K, the admittance of an inductance coil which is in absolute value equal to that of the capacitor, that is to say the admittance of a coil which is resonant with the capacitor, should be expressed by −K. This will be done henceforth.

Other features and advantages of the invention will be apparent in the following description.

In the accompanying drawings given merely by way of example:

The following embodiments of the invention will now be described:

(A)—the most general analog computing circuit embodying the invention;

(B)—particular circuits:

- (*a*) multiplication
- (*b*) addition
- (*c*) combined multiplication and addition (C)—combined circuits (D)—practical example.

(A) *General circuit*

In this first portion, the most general analog computing circuit according to the invention will be described.

While the physical nature and construction of this circuit and its various modifications are believed to be clearly set forth hereinafter, applicants have been so far unable to provide a completely satisfactory physical theory of the operation of these circuits, even though highly successful results have been achieved with apparently relatively simple means. However, the accuracy of the operation of the analog computing circuits according to the invention is clearly demonstrated by the calculations which will be made hereinafter and which have been fully verified in practice.

Figure 1:
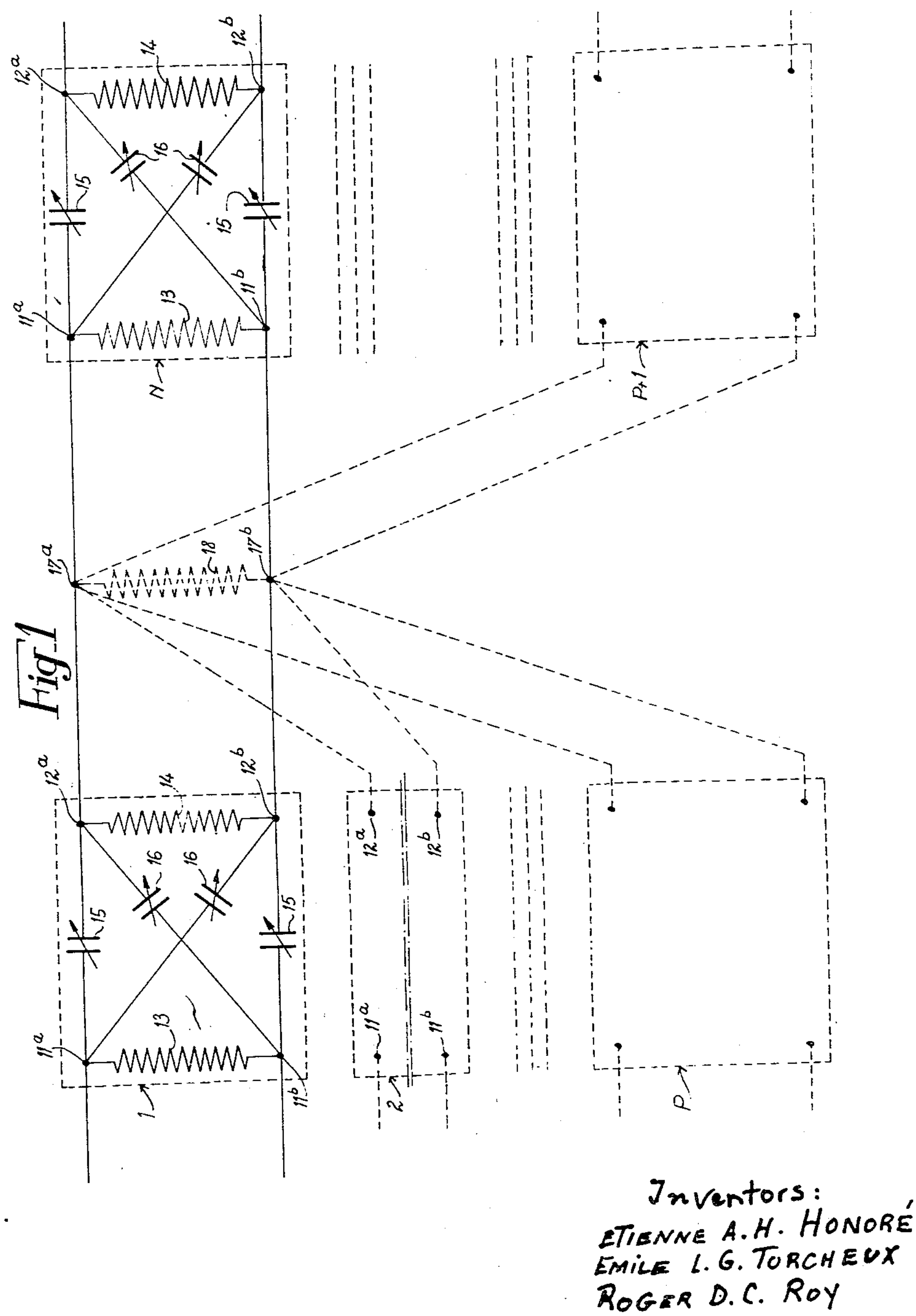
Fig. 1 shows the arrangement of a calculator network according to the invention in its most general form, that is to say comprising N quadripoles.

The embodiment of the calculator network according to the invention, shown in Fig. 1, comprises N quadripoles 1, 2 . . . *P*, *P*+1, . . . *N* (P being smaller than N), 1 and N of which have been shown completely, the others being simply represented symbolically in dotted lines.

Each quadripole comprises two input terminals $11^a$ and $11^b$ and two output terminals $12^a$ and $12^b$. A coil 13 having an admittance equal to −K is connected across the input terminals $11^a$ and $11^b$ and a coil 14 of the same admittance across the output terminals $12^a$ and $12^b$.

Each of the two input terminals $11^a$ and $11^b$ is symmetrically connected to both of the output terminals $12^a$ and $12^b$ by two variable capacitors, one 15 having an admittance equal to $(K+X)$, and the other 16 having an admittance $(K-X)$.

For a given frequency, the term K has a constant value for a given quadripole and the term X can, in each quadripole, vary between $-K$ and $+K$, while always retaining the same absolute value for the four capacitors 15 and 16 of said quadripole; in other words, the two capacitors 15 and 16 of each pair of capacitors connected to a same input terminal $11^a$ or $11^b$ can have an admittance varying from 0 to 2K.

For purposes of tuning each coil 13 or 14 of each quadripole to the operating frequency, the other coil 14 or 13 is short-circuited and the coil 13 or 14 is tuned to resonance with the capacitors of the circuit.

If this is done, each capacitor 16 is in parallel with a capacitor 15 and their total admittance is equal to $(K+X)+(K-X)=2K$, the two groups each including two of the above-mentioned capacitors are in series, which gives a total admittance equal to K.

This total admittance of the capacitors cancels thus the admittance $-K$ of the non-short-circuited coils.

All the quadriploes are connected in parallel, the output terminals $12^a$ and $12^b$ of quadripoles 1 to P and the input terminals $11^a$ and $11^b$ of quadripoles (P+1) to N being, for example, connected to the same pair of central terminals $17^a$ and $17^b$. Henceforth input terminals $11^a$ and $11^b$, which are not directly connected to the central terminals $17^a$ and $17^b$, will be called input terminals of the network, and output terminals $12^a$ and $12^b$ which are also not directly connected to said terminals $17^a$ and $17^b$ will be called output terminals of the network.

It is known that all coils 14 and 13 that are connected directly to terminals $17^a$ and $17^b$ may be replaced by a single central coil 18 (in dotted lines in the figure) having an admittance equal to the sum of the admittances of said coils 14 and 13, and it will be assumed that this is done henceforth.

If voltages having a given frequency, to which all the quadripoles are tuned, are applied to the input terminals $11^a$ and to the input terminals $11^b$ of the network, symmetrical voltages are created across output terminals $12^a$ and $12^b$ of the network.

Now if it is assumed that the coils utilized have no ohmic resistance, that they are perfectly regulated, and that the impedance of the measuring device or devices connected across the output terminals of the network is infinite, it may be easily shown that the applied voltages and the obtained voltages are related by the general law:

$$V_1X_1+V_2X_2+\ldots V_NX_N=0 \qquad (1)$$

$X_1, X_2 \ldots X_N$ being the values of X relating to the various quadripoles, 1 to N indicating the quadripole concerned. By way of demonstration of this relation, consider separately two quadripoles, 1 and N for example.

As already stated, coils 14 of the quadripole 1 and 13 of the quadripole N are replaced by the coil 18. Moreover, due to the symmetry of the circuit considered, if symmetrical voltages $V_1$ and $-V_1$ are applied to the input terminals of the quadripole 1, symmetrical voltages $V_N$ and $-V_N$ will be present at the output terminals of quadripole N.

According to Kirchhoff's law, the sum of the currents in various branches converging at the point $17^a$ or $17^b$ is nil. For simplicity's sake, currents flowing toward the points $17^a$ and $17^b$ will be termed positive and those flowing from these points will be termed negative. Moreover it should be borne in mind that the intensity of a current in a branch is equal to the voltage difference between the terminals of this branch multiplied by the admittance of the branch.

Considering now branch $17^a$—$12^a$—$11^a$, voltage at $17^a$ being U, voltage at $11^a$ being $V_1$ and the admittance of the branch being $K_1+X_1$, the current in this branch may be expressed as:

$$(K_1-X_1)\ (U+V_1)$$

In the same way the following values of the current flowing through the respective branches meeting at the point $17^a$ may be derived:

Branch $17^a$—$12^a$—$11^b$ (quadripole 1)

$$(K_1-X_1)\ (U+V_1)$$

Branch $17^a$—$11^a$—$12^a$ (quadripole N)

$$(K_N+X_N)\ (U-V_N)$$

Branch $17^a$—$11^a$—$12^b$ (quadripole N)

$$(K_N-X_N)\ (U+V_N)$$

Branch $17^a$—$17^b$ $$(-K_1-K_N)\ (U+U)$$

As stated above, the sum of these currents is nil. After adding these currents and simplifying it is found that:

$$V_1X_1+V_NX_N=0$$

It is sufficient to repeat the same calculation by adding the other quadripoles to establish the above-mentioned general law (1).

However, it will be readily understood that the assumptions made above in demonstrating the general law (1) of the network according to the invention are not actually true. In fact the theoretical law (1) is modified by the following facts: the impedance or impedances which are in fact connected in applications of this network, across the output terminals of the network never have infinite values; the various inductance coils of said circuit have internal resistances; and, lastly, the adjustment of these inductance coils is imperfect with respect to accuracy.

Consequently, the law (1) is a purely theoretical one, and the law which really governs the relation between the input and output voltages is in fact different from the expression (1).

Now it will be shown that the errors due to the above causes are very small as they intervene only in the second order in said relation (1).

That is to say, for example, that if the impedance of the load or meter connected across the output terminals of a network, instead of being infinite, is only 200 times higher than those of the coils used in the network, if the internal resistances of these coils are equal to $$\frac{1}{200}$$

of their impedances instead of being nil, and if the adjustment of the admittance of these coils is performed with a precision up to about $$\frac{1}{200}$$

instead of being perfect, then the total errors introduced by these various causes in the above-mentioned relation (1) are of the order of $$\frac{1}{40{,}000}$$

To simplify matters, the case of quadripoles 1 and N alone will be considered. The expression "perturbation admittance" will be utilized hereinafter for the purposes of the following error calculation to designate the deviation of the actual admittance from the theoretical admittance assumed above in the demonstration of the general law (1).

Now let it be assumed that: $k_1$ is the perturbation admittance of coil 18, due to the fact that this coil is not susceptible of perfect adjustment, that it has a certain ohmic resistance, and that there are stray capacity losses; $k_2$ is the perturbation admittance of coil 14 of quadripole N due to the same causes as in the case of quadripole 1; $k_3$ is the perturbation admittance due to the fact that the impedance of the load or meter connected to the output terminals 12$^a$ and 12$^b$ of quadripole N does not have an infinite value; $V_1$ and $-V_1$ are the symmetrical voltages assumed applied to the input terminals 11$^a$ and 11$^b$ of the network formed of quadripoles 1 and N; $V_N$ and $-V_N$ are the symmetrical voltages at the output terminals 12$^a$ and 12$^b$ of the network; and V and $-V$ are the symmetrical voltages at terminals 17$^a$ and 17$^b$.

The sum of the currents flowing from or to terminal 17$^a$ is obviously nil, according to Kirchhoff's law as already pointed out above.

These currents may be expressed as follows:

(*a*) in the left branch $17^a$—$12^a$—$11^a$: $(K_1+X_1)(U-V_1)$ this is the product of the admittance by the difference in potential between the points $11^a$ and $17^a$ (*b*) in the left branch $17^a$—$12^a$—$11^b$: $(K_1-X_1)(U+V_1)$ (*c*) in the centre branch $17^a$—$17^b$: $(-K_1-K_N+k_1)(U+U)$ (*d*) in the right branch $17^a$—$11^a$—$12^a$: $(K_N+X_N)(U-V_N)$ (*e*) in the right branch $17^a$—$11^a$—$12^b$: $(K_N-X_N)(U+V_N)$ On adding these five values and simplifying, the following relation is obtained:

$$k_1U-V_1X_1-V_NX_N=0$$

Moreover, the sum of the currents from or to the right output terminal 12$^a$ is also nil.

These currents may similarly be expressed as follows:

(*a*) in the branch $12^a$—$11^a$—$17^a$: $(K_N+X_N)(V_N-U)$ (*b*) in the branch $12^a$—$11^b$—$17^b$: $(K_N-X_N)(V_N+U)$ (*c*) in the branch $12^a$—$12^b$: $(-K_N+k_2+k_3)(V_N+V_N)$ On adding these three values and simplifying, the following relation is obtained:

$$(k_2+k_3)V_N-UX_N=0$$

From the relation above it can be derived that:

$$V_N=\frac{-V_1X_1}{X_N}\times\frac{1}{1-\frac{k_1(k_2+k_3)}{X^2_N}} \qquad (2)$$

It is noted that this expression differs from the previously stated theoretical law:

$$V_N=\frac{V_1X_1}{X_N}$$

only by the present coefficient:

$$\frac{1}{1-\frac{k_1(k_2+k_3)}{X^2_N}}$$

which differs from unity due only to the existence of the term:

$$\frac{k_1(k_2+k_3)}{X^2_N}$$

If the perturbation admittances $k_1$ and $(k_2+k_3)$ are, for example, 200 times smaller than the admittances $X_N$, the term $$\frac{k_1(k_2+k_3)}{X^2_N}$$

will be of the order of $$\frac{1}{N2}$$

for example:

$$\frac{1}{40{,}000}$$

Thus it is seen that the real law (2), which in fact expresses the actual relationship of the voltages applied to the network, differs from the theoretical law $$V_N=\frac{-V_1X_1}{X_N}$$

only by a factor of the second order.

In the above demonstration, it had been assumed that the voltages at the input of the network were symmetrical, $+V_1$ and $-V_1$. A similar demonstration, although longer, would give the same result with voltages that are not symmetrical, for example $+V_1$ and zero.

In the example just described, which constitutes a calculator network according to the present invention in its more general form, it has been assumed that the capacitor values vary between zero and 2K as explained above.

Figure 2:
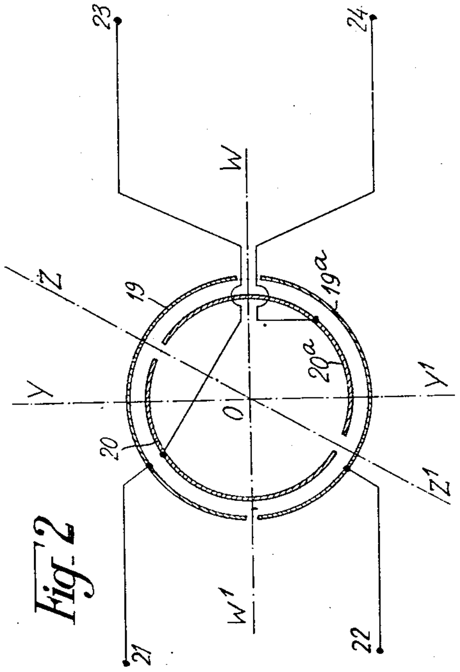
Fig. 2 shows diagrammatically in section a variable capacitor suitable for this network.

It will now be shown how it is possible to obtain the above-described simultaneous variation of the four capacitors of the same quadripole, which in a specific case may be a linear variation. There could be used, to this end, the variable capacitor shown in Fig. 2. It is in the form of two coaxial cylindrical plates, each divided respectively into two equal parts 19 and 19$^a$, and 20 and 20$^a$. The external parts 19 and 19$^a$ form the fixed plates of the capacitor. The internal parts 20 and 20$^a$ form the movable plates and move simultaneously by rotation about an axis 0 with respect to the fixed plates 19 and 19$^a$. The latter are connected, for example, to the input terminals 21 and 22 respectively of a quadripole and the movable plates 20 and 20$^a$ are connected to the output terminals 23 and 24 respectively of the same quadripole. If K is the capacity between two plates, namely between a fixed and a movable plate, for one quadrant shown, for example, by the perpendiculars OY, OW$^1$, and X the capacity between the same two plates, for an angle YOZ, the axis ZOZ$^1$ being in the plane of separation of the two movable plates 20 and 20$^a$, it will be immediately seen that the capacity between terminals 21 and 23 has a value $K+X$, the capacity between terminals 22 and 23 will be $K-X$, and the capacity between terminals 23 and 24 will be $K+X$, with the variant of $+K$ when axis ZOZ$^1$ has turned through 180° relative to its previous position.

When axis ZOZ$^1$ coincides with the axis YOY$^1$ the capacities between terminals 21 and 23, 21 and 24, 22 and 23, and 22 and 24 are all equal to K. When axis ZOZ$^1$, after having turned through 90°, coincides with axis WOW$^1$, the capacities between terminals 21 and 23 and terminals 22 and 24 are both equal to 2K, whereas the capacities between terminals 21 and 24 and terminals 22 and 23 are both nil. If axis ZOZ$^1$ has turned through 90° in the other direction, the capacities between terminals 21 and 24 and terminals 22 and 23 would be all equal to 2K.

It is obvious that with any other type of plates the variations of the four said capacitors might follow any other desired law, for example, a sinusoidal law, the rule according to which the capacitors vary relative to each other being always respected, i. e., that rule being that the capacities of capacitors 15 vary in opposite direction to the capacities of capacitors 16.

B. *Particular circuits*

Some modifications of the calculator network, will now be described more fully by reference to corresponding figures of the drawing.

These modifications enable the performance of elementary arithmetical operations and may be used in numerous applications.

Figure 3:
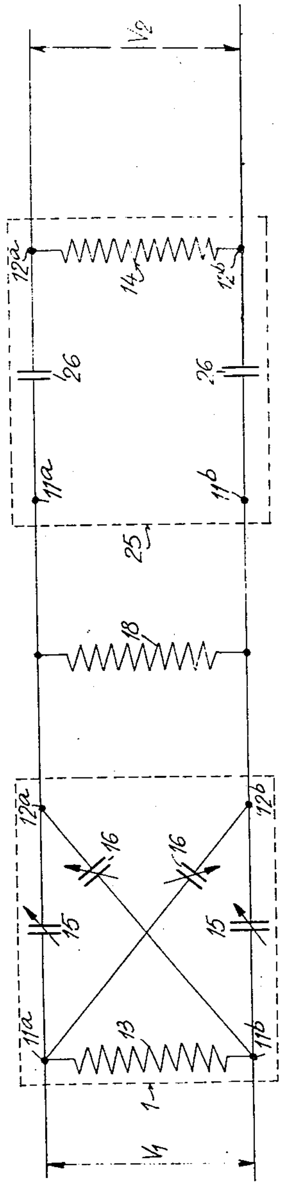
Figs. 3 to 5 show various modifications of the calculator networks according to the invention.

(*a*) *Multiplication circuit* (*Fig. 3*)

This calculator network is formed of two quadripoles 1 and 25. The quadripole 1 is identical to each of those in the general lay-out of Fig. 1. In the second quadripole 25 a fixed value $K_2$ has been given to the term $X_2$. The admittances of the capacitors 26, which correspond to the capacitors 15 of the lay-out in Fig. 1, are then equal to $2K_2$, whereas those of the two other capacitors 16 of this lay-out are nil. That is to say, that in fact these last two capacitors are omitted. The other corresponding elements of the calculator network of Fig. 1 are unchanged from Fig. 1. It suffices to apply the general law to see that the voltage obtained at the terminals 12ᵃ and 12ᵇ of the quadripole 25 has for its value:

$$V_2 = \frac{-V_1X_1}{K_2}$$

A multiplication is thus obtained between the initial voltage $V_1$ and a variable factor $X_1$, which depends on the actual value thereof as determined, for example, by the angular position of the rotatable plate of a capacitor of the type mentioned above and shown in Fig. 2.

If now in Fig. 3, instead of taking as input terminals of the network the terminals 11ᵃ and 11ᵇ of the quadripole 1, the terminals 12ᵃ and 12ᵇ of quadripole 25 are taken, the process is reversed, and a division of the initial voltage by a variable factor is obtained.

(*b*) *Addition (Fig. 4)*

Figure 4:
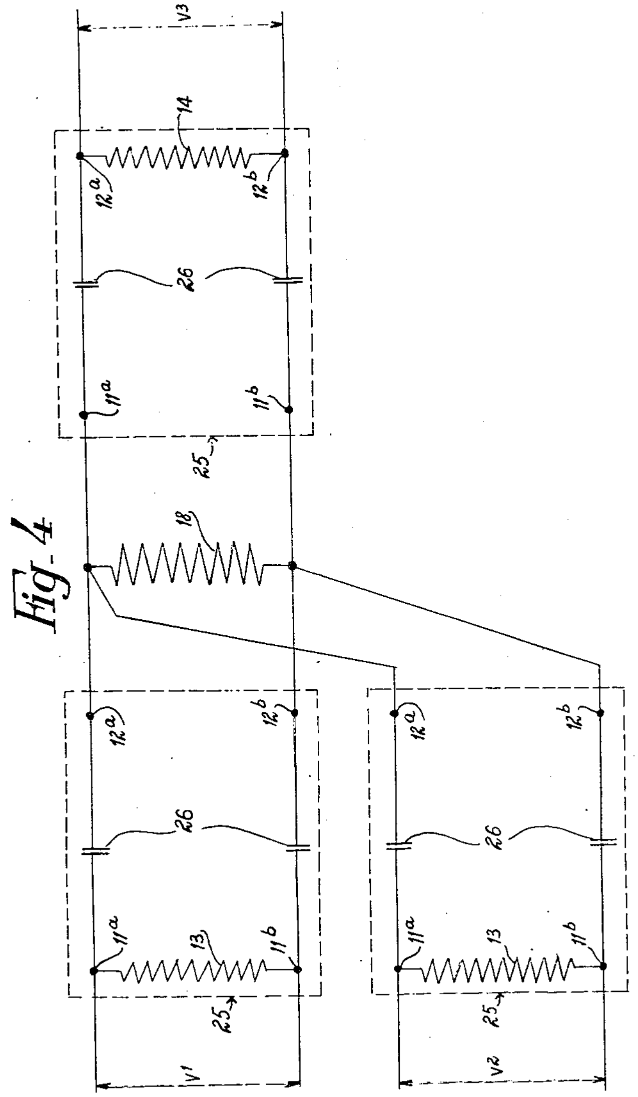

The modification according to Fig. 4 refers to a calculator network composed of three quadripoles identical to quadripole 25 of the preceding example shown in Fig. 3.

If these three quadripoles 25 have capacitors all having the same admittance 2K, there results:

$$V_1+V_2+V_3=0$$

The calculator network allows, in this case, the performance of voltage additions, in the algebraic sense of the word.

(*c*) *Combined multiplication and addition*

Figure 5:
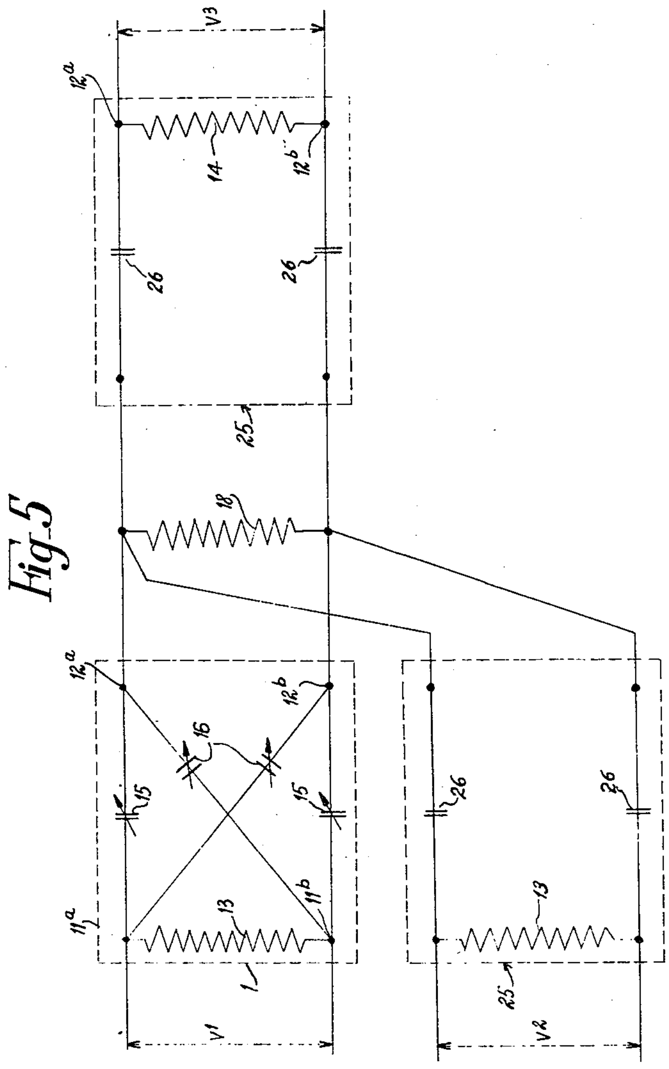

Fig. 5 shows a modification of the preceding example. The network has a quadripole 1 of the type shown in Fig. 1, and two quadripoles 25 of the type in Fig. 3. The term X of capacitors 15 and 16 of quadripole 1 remains variable whereas the two capacitors 26 of the quadripoles 25 have fixed capacities and their admittances are respectively all equal to $2K_2$ and $2K_3$.

In this case the application of the general law gives:

$$V_1X+V_2K_2+V_3K_3=0$$

In other words, the output terminals 12ᵃ and 12ᵇ of the network provide a voltage $V_3$ equal to the sum $$-\frac{V_1X}{K_3}-\frac{V_2K_2}{K_3}$$

that is to say, the network provides at the same time an addition and a multiplication by means of a variable coefficient X.

(C.) *Combined circuits*

In the above examples, only a single calculator network has been employed, but in certain cases several networks could be profitably combined.

Figure 6:
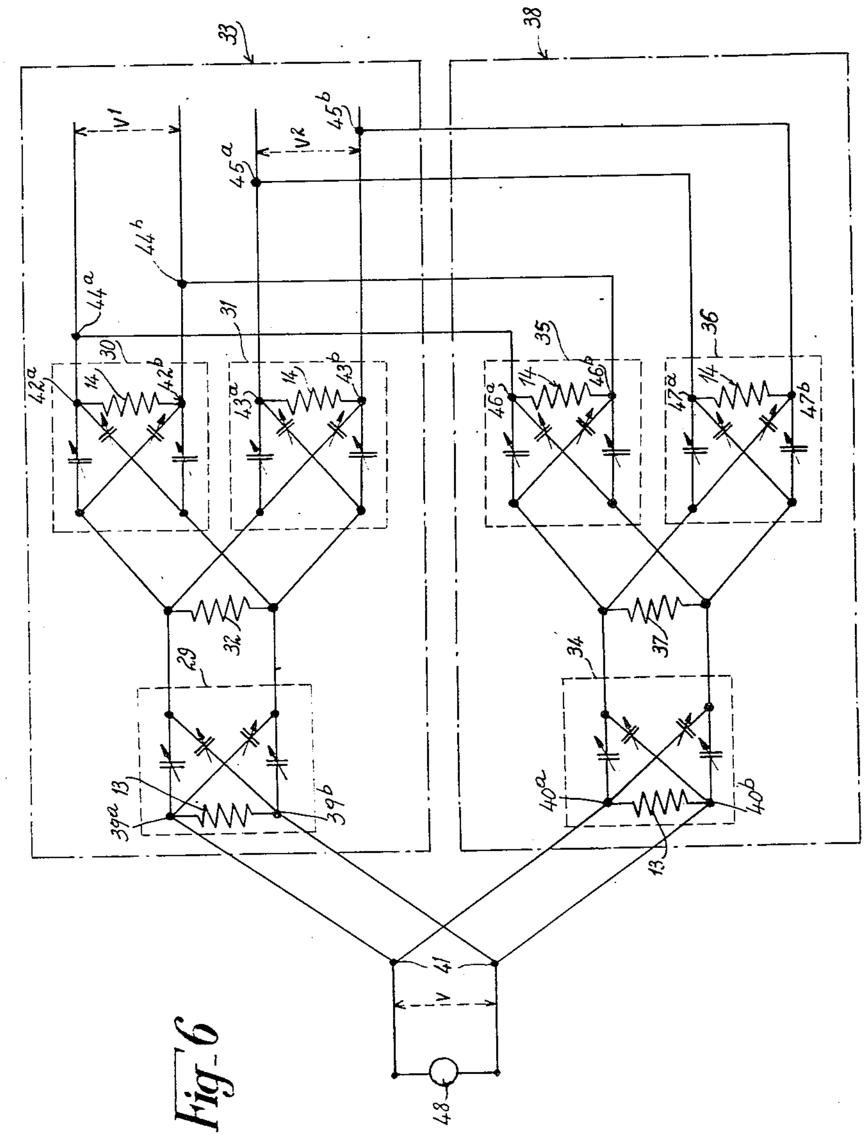
Figs. 6 and 7 show combinations of calculator networks.

An example of such a combination will now be given with reference to Figs. 6 and 7, this combination being capable of solving a group of equations of the type:

$$AX+BY+C=0 \quad (3)$$
$$A'X+B'Y+C'=0 \quad (4)$$

The quadripoles 29, 30 and 31, connected to a common inductance coil 32, constitute a first network 33 outlined in chain-dotted lines in the drawing. Three other quadripoles 34, 35 and 36 are connected to a common inductance coil 37 and constitute a second calculator network 38. The input terminals 39ᵃ and 39ᵇ and 40ᵃ and 40ᵇ respectively of these two calculator networks 33 and 38 are connected to terminals 41 of an alternating voltage source 48. The output terminals 42ᵃ and 42ᵇ; and 43ᵃ and 43ᵇ of the quadripoles 30 and 31 respectively are connected at 44ᵃ and 44ᵇ and at 45ᵃ and 45ᵇ respectively to output terminals 46ᵃ and 46ᵇ, and to output terminals 47ᵃ and 47ᵇ of the quadripoles 35 and 36.

The values in X of the terms relating to quadripoles 29, 30, 31, 34, 35, 36 will be designated respectively by $X_1$, $X_2$, $X_3$, $X_4$, $X_5$, $X_6$. Moreover, the applied voltage will be designated by V, the voltage at terminals 44 by $V_1$, and the voltage at terminals 45 by $V_2$.

The calculator network 33 gives the following relation:

$$V_1X_2+V_2X_3+VX_1=0$$

which may be expressed as:

$$X_2\frac{V_1}{V}+X_3\frac{V_2}{V}+X_1=0$$

The other calculator network 38 gives the relation:

$$V_1X_5+V_2X_6+VX_4=0 \quad (5)$$

which can be expressed as:

$$X_5\frac{V_1}{V}+X_6\frac{V_2}{V}+X_4=0 \quad (6)$$

If, by the adjustment of the variable capacitors of the quadripoles, the terms $X_2$, $X_3$ and $X_1$ of the Relation 5 are given respectively the values A, B and C of the Equation 3 and likewise the terms $X_5$, $X_6$ and $X_4$ of the Relation 6 are given values A', B' and C' of the Equation 4, it will be immediately seen that the Expressions 5 and 6 become respectively:

$$A\frac{V_1}{V}+B\frac{V_2}{V}+C=0$$

$$A'\frac{V_1}{V}+B'\frac{V_2}{V}+C=0$$

It suffices, by means of voltmeters connected across terminals 41 of the power supply 48 and terminals 44ᵃ and 44ᵇ on the one hand, and 45ᵃ and 45ᵇ on the other hand, to measure the voltages V, $V_1$ and $V_2$, then to deduce the relations $$\frac{V_1}{V} \text{ and } \frac{V_2}{V}$$

in order to obtain the values of the unknowns X and Y of the two Equations 3 and 4 to be solved.

Figure 7:
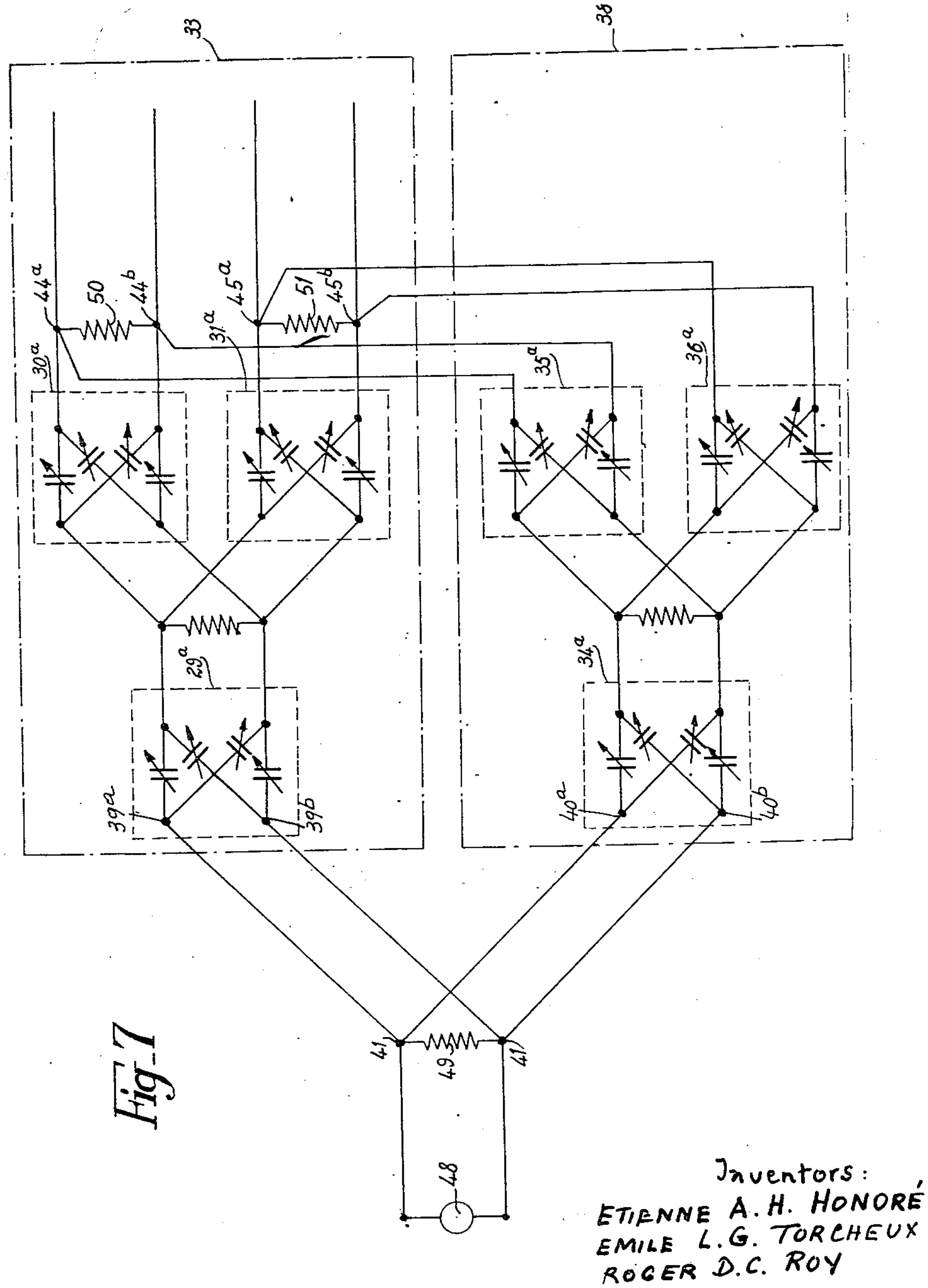

It is possible to introduce certain simplifications into the example just given, as is shown in Fig. 7. The inductance coils 13 which belong respectively to quadripoles 29 and 34, may be replaced in the case of quadripoles 29ᵃ and 34ᵃ of the Fig. 7 by a single coil 49 connected to terminals 41 of the power supply 48. An identical simplification has been made with respect to the coils 14 of quadripoles 30, 31, 35 and 36 in Fig. 6. These coils are replaced in the modification of Fig. 7 by two coils 50 and 51 connected respectively between terminals 44ᵃ and 44ᵇ and terminals 45ᵃ and 45ᵇ. The values of the admittances of coils 49, 50 and 51 are, of course, the sums of the respective admittances of the two coils that each of them replaces.

In a general way, any number of calculator networks according to the invention may be combined, provided that they are all adjusted or tuned to a same frequency.

(D.) *Practical example*

The network according to the invention and its diverse combinations have numerous practical applications.

Figure 8:
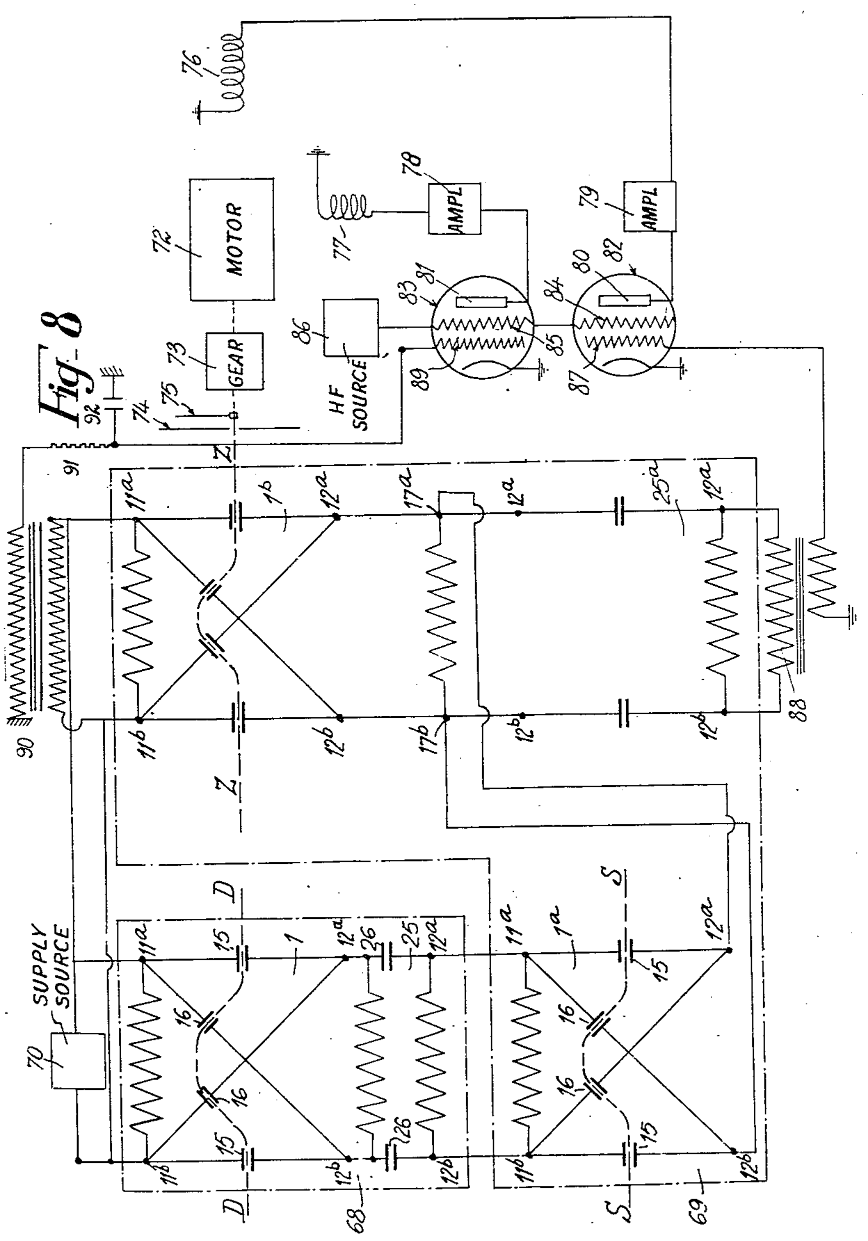
Fig. 8 shows a practical application of the invention.

An example of such an application will now be described with reference to Fig. 8. It relates to the problem of finding, in space, the co-ordinate Z, that is to say the height relative to a given point, of an object of which the elevation angle and the distance D relative to this point are known, that is to say, to effect the conversion of D. sin S into Z.

The device is composed essentially of two calculator networks 68 and 69, fed by source 70, for example of 100 volts, at high frequency F, for example, 500 kilocycles. The network 68, which is of the multiplication type already described above in connection with Fig. 3, has two quadripoles 1 and 25, and the network 69 has three quadripole $1^a$, $1^b$ and $25^a$. In the quadripoles making up these networks, the value K corresponds, for example, to 100 μμF for the capacitors and, consequently, about 1 mh. for the inductance coils.

The quadripole 1 is provided with four variable capacitors 15 and 16, of the above-described type. The shaft of the capacitor is diagrammatically represented in the figure by the line DD, and its rotation is controlled from a radar capable of determining the distance and location of the object sighted, whereby this shaft rotates through an angle proportional to the distance D of that object.

The quadripole 25 of the network has two fixed capacitors 26 of equal value. The output terminals $12^a$ and $12^b$ of the quadripole 25 are connected to the input terminals $11^a$ and $11^b$ of the second network 69. These input terminals constitute the input terminals of quadripole $1^a$ belonging to that network 69.

This quadripole $1^a$ is identical to the input quadripole 1 of the network 66 just described. The shaft of its variable capacitor, diagrammatically represented by the line ZZ, is also controlled by the same radar and rotates through an angle proportional to sin S, S being the elevation angle of the object sighted by the radar.

According to a modification, the shaft of the above-mentioned type of variable capacitor which is provided in the quadripole $1^a$ rotates proportionally to S and the shape of the plates of this capacitor is such that the capacity variations thereof follow a sinusoidal law.

The output terminals $12^a$ and $12^b$ of quadripole $1^a$ are connected to central terminals $17^a$ and $17^b$ of network 69. Quadripole $25^a$ is identical to the above-mentioned quadripole 25 and its input terminals $11^a$ and $11^b$ are connected to aforesaid terminals $17^a$ and $17^b$.

The quadripole $1^b$ is connected by its input terminals $11^a$ and $11^b$ to the supply source 70 and by its output terminals $12^a$ and $12^b$ to aforesaid terminals $17^a$ and $17^b$. This quadripole $1^b$ is constituted similarly to quadripole 1. The shaft of its capacitor, diagrammatically represented by the line ZZ, is driven by a motor 72 through a suitable reduction gear 73. Moreover, this shaft is provided with a pointer 75 which allows readings to be taken, on a graduated dial 74, of the angle of rotation of shaft ZZ.

The motor 72 is a two phase motor, the windings 76 and 77 of which are connected respectively through amplifiers 79 and 78 to plates 80 and 81 of two frequency changer tubes 82 and 83, the grids 84 and 85 of which are connected to a high frequency supply 86 of a frequency $F+f$, $f$ being, for example, 50 cycles. The input grid 87 of tube 82 is connected to the secondary winding of a transformer 88, the primary of which is connected to output terminals $12^a$ and $12^b$ of quadripole $25^a$ in such a way that this grid is fed at a variable voltage with the frequency F of the supply source 70. Furthermore, the input grid 89 of the tube 83 is fed with a constant voltage at the frequency F, for example from the secondary winding of a transformer 90, through a resistance 91, the output terminal of which is connected to one plate of a capacitor 92, the other plate being earthed, and the primary of the transformer 90 being connected to the supply source 70.

The operation of the arrangement is as follows:

The constant voltage V of the supply 70 produces at the output terminals $12^a$ and $12^b$ of the network 68, a voltage $$V_1=-\frac{VX_1}{X}$$

$X_1$ being proportional to the distance D, since the shaft DD of the capacitor has performed a rotation proportional to the distance D.

The network 69 receives at the input of quadripole $1^a$ the voltage $V_1$ and at the input of quadripole $1^b$ the voltage V. It gives then at its output a voltage $$V_2=-\frac{V_1X_2}{K}-\frac{VX_3}{K}$$

that is to say:

$$V_2=V\left(\frac{X_1X_2}{K_2}-\frac{X_3}{K}\right)$$

$X_2$ being proportional to sin S, and $X_3$ to M, M being the height indicated by the pointer 75 on the dial 74, thus:

$$V_2=V\ (aD.\sin S-bM)$$

$a$ and $b$ being constants which are, of course, rendered equal by a suitable graduation of the dial 74, giving:

$$V_2=aV\ (D.\sin S-M)$$

This voltage $V_2$ is applied through the transformer 88 to the input grid 87 of tube 82 which lowers the frequency to $f$, 50 cycles for example; the current in the circuit of the anode 80 is then amplified by amplifier 79 and enters winding 76 of motor 72. As, moreover, winding 77 is traversed by the constant current 90° out of phase relative to the circuit supplied by the plate 80 of tube 82, this current being supplied at the same frequency $f$ by plate 61 of tube 83 through amplifier 78, motor 72 rotates and drives the shaft ZZ until the voltage in the primary of transformer 88 is cancelled, giving:

$$V_2=0$$

then $$M=D.\sin S$$

In other words, the height M indicated by pointer 75 gives the height value $Z=D.\sin S$ of the object sighted.

To simplify the example, the calculation of $Z=D.\sin S$ has been described. Obviously in a similar manner the co-ordinates X and Y in terms of the elevation angle S, the distance D, and the azimuth G may be obtained.

Of course, the invention is in no way limited to the use of the above circuits in analog computers. In fact, wherever a voltage or voltages must be transformed by addition, subtraction, multiplication or addition with one or more other voltages, the circuits according to the invention may be used to advantage without departing from the scope of the appended claims.

Having now described our invention what we claim as new and desire to secure by Letters Patent is:

1. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network having at least two quadripoles, each quadripole having a first, a second, a third, and a fourth terminal, a first and a second inductance coil equal to each other and at least a pair of capacitors, the capacities of said pair of capacitors being equal, the first inductance coil being connected across the two odd terminals and the second across the two even terminals, each of said capacitors being connected to an odd and an even terminal, an odd terminal being directly connected to an even terminal through at most one of said capacitors, the two capacitors of a pair of capacitors having no common terminal, and the admittance of each one of the inductance coils of said network being for said fixed frequency equal to half the mathematical sum of the admittances of all the capacitors directly connected to any one of its ends, and said second inductance coils of all the quadripoles of the network being connected in parallel.

2. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network having at least two quadripoles, each quadripole having a first, a second, a third, and a fourth terminal, a first and a second inductance coil equal to each other and at least a pair of capacitors, the capacities of said pair of capacitors being equal, the first inductance coil being connected across the two odd terminals, and the second across the two even terminals each of said capacitors being connected to an odd and an even terminal, an odd terminal being directly connected to an even terminal through at the most one of said capacitors, the two capacitors of a pair of capacitors having no common terminal, and the admittance of each one of the inductance coils of said network being for said fixed frequency equal to half the mathematical sum of the admittances of all the capacitors directly connected to any one of its ends, in at least one of said quadripoles each of the ends of said first inductance coil being connected to each of the ends of said second inductance coil through one of said capacitors, said one capacitor being variable, and the sum of the two capacities connected to any one of the terminals of said quadripole being constant, and said second inductance coils of all the quadripoles of the network being connected in parallel.

3. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network having at least two quadripoles, each quadripole having a first, a second, a third, and a fourth terminal, a first and a second inductance coil equal to each other and at least a pair of capacitors, the capacities of said pair of capacitors being equal, the first inductance coil being connected across the two odd terminals and the second across the two even terminals, each of said capacitors being connected to an odd and an even terminal, an odd terminal being directly connected to an even terminal through at the most one of said capacitors, the two capacitors of a pair of capacitors having no common terminal, and the admittance of each one of the induction coils of said network being for said fixed frequency equal to half the mathematical sum of the admittances of all the capacitors directly connected to any one of its ends, and at least one of said quadripoles having only one pair of capacitors, said one pair being fixed capacitors, and said second inductance coils of all the quadripoles of the network being connected in parallel.

4. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network having at least two quadripoles, each quadripole having a first, a second, a third, and a fourth terminal, a first and a second inductance coil, a first, a second, a third and a fourth capacitor, said first inductance coil being connected across the two odd terminals, said second inductance coil being connected across the two even terminals, said first capacitor being connected between said first and said second terminals, said second capactior being connected between the third and fourth terminals, said third capacitor being connected between said first and said fourth terminals, said fourth capacitor being connected between said third and second terminals, the admittance of said first and said second inductance coil being for said fixed frequency equal to the same fixed value $-K$, the admittances of said first and second capacitors being for this same frequency both equal to $K+X$, X being any value between $-K$ and $+K$ the admittances of said third and fourth capacitors being for this same frequency equal to $K-X$, and all of said second inductance coils of said network being connected in parallel.

5. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network comprising two quadripoles each having a first, a second, a third, and a fourth terminal, a first and a second inductance coil of equal value and two pairs of variable capacitors, the capacities, belonging to a same pair of capacitors, being equal, the first inductance coil being connected across the two odd terminals and the second across the two even terminals, each of said odd terminals being directly connected to each of said even terminals through one of said capacitors, and the sum of the two capacities connected to any one of the terminals of said quadripoles being constant, and the admittance of each one of the inductance coils of said nework being for said fixed frequency equal to half the sum of the admittances of all the capacitors connected to any one of its ends, and said second inductance coils of the quadripoles of the network being connected in parallel.

6. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network comprising at least three quadripoles each having a first, a second, a third, and a fourth terminal, a first and a second inductance coil of equal value and two pairs of capacitors, one pair of capacitors respectively directly connecting one odd terminal to one even terminal, the capacities, belonging to a same pair of capacitors, being equal, the first inductance coil being connected across the two odd terminals and the second across the two even terminals, and the admittance of each one of the inductance coils of said network being for said fixed frequency equal to half the mathematical sum of the admittances of all the capacitors connected to any one of its ends, and said second inductance coils of the quadripoles of the network being connected in parallel.

7. In a calculator using at least one alternating voltage of a fixed frequency, providing at least one other voltage of the same frequency and employing as intermediate elements networks permitting, with the voltage of fixed frequency, the performance of such operations as addition, subtraction, multiplication, division, a network comprising at least two quadripoles each quadripole having a first, a second, a third and a fourth terminal, a first and second reactive element having the same reactance and at least one pair of other reactive elements, the respective reactances of said pair of other elements being equal to each other and opposite in sign to the reactance of said first and second reactive elements, the first reactive element being connected across the two odd terminals and the second across the two even terminals, an odd terminal being directly connected to an even terminal through at most one of said other reactive elements, the two reactive elements of a pair of reactive elements having no common terminal, and the admittance of each one of said first and second reactive elements of said network being for said fixed frequency equal in absolute value to half the mathematical sum of the admittances of all the other reactive elements connected to any one of its ends, and said second relative elements of all quadripoles of the network being connected in parallel.

8. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network comprising two quadripoles each having a first, a second, a third and a fourth terminal, a first and a second inductance coil of equal value, one quadripole having two pairs of capacitors and the other one pair of capacitors, in one of said quadripoles each of the ends of said first inductance coil being connected to each of the ends of said second inductance coil through one of said capacitors, this capacitor being variable, and the sum of the two capacities connected to any one of the terminals of said quadripoles being constant, in the other of said quadripoles, one pair of capacitors respectively directly connecting one odd terminal to one even terminal, the capacity of a pair of capacitors being equal, the first inductance coil being connected across the two odd terminals and the second across the two even terminals, and the admittance of each one of the inductance coils of said network being for said fixed frequency equal to half the mathematical sum of the admittances of all the capacitors connected to any one of its ends, and said second inductance coils of the quadripoles of the network being connected in parallel.

9. In a calculator of the type having input and output terminals, and adapted to receive across said input terminals one or more respective voltages of the same and fixed frequency, for performing on said voltage or voltages at least one such operation as addition, subtraction, multiplication and addition, thereby to provide across said output terminals one or more respective voltages of the same said frequency and having a value or values resulting from said operation, a network comprising a first, a second and a third quadripoles each having a first, a second, a third and a fourth terminal, a first and a second inductance coil of equal value, said first and second quadripoles having one pair of capacitors and said third quadripole having two pairs of capacitors, in said third quadripole, each of the ends of said first inductance coil being connected to each of the ends of said second inductanace coil through one of said capacitors, this capacitor being variable, and the sum of the two capacities connected to any one of the terminals of said third quadripole being constant, and in said first and second quadripoles, one pair of capacitors respectively directly connecting an odd terminal to an even terminal, the capacities of a pair of capacitors being equal, the first inductance coil being connected across the two odd terminals and the second across the two even terminals, and the admittance of each one of the inductance coils of said network being for said fixed frequency equal to half the mathematical sum of the admittances of all the capacitors connected to any one of its ends, and said second inductance coils of the quadripoles of the network being connected in parallel.

10. In a voltage transformer device, for providing from at least one alternating voltage having a given frequency at least one other voltage of the same frequency by performance on said first-named voltage of at least one such operation as addition, subtraction, multiplication, and division, a network having at least two quadripoles, each quadripole having a first, a second, a third, and a fourth terminal, a first and a second inductance coil equal to each other and at least a pair of capacitors, the capacities of said pair of capacitors being equal, the first inductance coil being connected across the two odd terminals and the second across the two even terminals, each of said capacitors being directly connected to an odd and an even terminal, an odd terminal being connected to an even terminal through at most one of said capacitors, the two capacitors of a pair of capacitors having no common terminal, and the admittance of each one of the inductance coils of said network being for said fixed frequency equal to half the mathematical sum of the admittances of all the capacitors connected to any one of its ends, and said second inductance coils of all the quadripoles of the network being connected in parallel.

11. In a voltage transformer device, for providing from at least one alternating voltage having a given frequency at least one other voltage of the same frequency by performance on said first-named voltage of at least one such operation as addition, subtraction, multiplication and division, a network having at least two quadripoles, each quadripole having a first, a second, a third, and a fourth terminal, a first and a second inductance coil, a first, a second, a third and a fourth capacitor, the first inductance coil being connected across the two odd terminals and the second across the two even terminals, said first capacitor being directly connected between said first and said second terminals, said second capacitor between said third and fourth terminals, said third capacitor between said first and fourth terminals and said fourth capacitor between said third and second terminals, the admittance of said first and second inductance coils being for said fixed frequency all equal to the same fixed value $-K$, the admittances of said first and second capacitors being for this same fixed frequency both equal to $K+X$ and those of said third and fourth capacitors to $K-X$, X being any value between $-K$ and $+K$, and all of said second inductance coils of said network being connected in parallel.

12. In a calculator network, at least two quadripoles each including first, second, third and fourth terminals, a first inductance coil connected between the even terminals of each quadripole and a second inductance coil connected between the odd terminals of each quadripole, at least one pair of capacitors for each quadripole, each even terminal of each quadripole being directly connected with at least one odd terminal of the same quadripole through one of said capacitors, the admittance of each of said inductance coils being equal at the operating frequency to half the mathematical sum of the admittances of all the capacitors connected to any one of the terminals to which said inductance coil is connected, and means connecting said second coils in parallel.

13. In a calculator using at least one alternating voltage of a fixed frequency, providing at least one other voltage of the same frequency and employing as intermediate elements networks permitting, with the voltage of fixed frequency, the performance of such operations as: addition, subtraction, multiplication, division, a circuit comprising at least two quadripoles having each two external and two internal terminals and reactive elements of opposite signs, a reactive element of one sign being directly connected across the external terminals and reactive elements of the other sign being directly connected between an internal terminal and an external terminal, two common terminals to which said two internal terminals of all the quadripoles are respectively connected, a common reactive element of said one sign connected across said common terminals, each quadripole forming a series resonant circuit with its internal terminals shorted, and said circuit being resonant with the external terminals of each quadripole shorted.

14. In a calculator using at least one alternating voltage of a fixed frequency, providing at least one other voltage of the same frequency and employing as intermediate elements networks permitting, with the voltage of fixed frequency, the performance of such operations as: addition, subtraction, multiplication, division, a circuit comprising at least two quadripoles, each quadripole comprising two pairs of terminals and reactances of opposite signs, the reactances of one sign being respectively directly connected across the terminals of each of said pairs and reactances of the other sign being respectively directly connected between two terminals of different pairs, the reactances of each quadripole being series resonant with one of said pairs of terminals shorted, one of said reactances connected across one of said pairs of terminals of each quadripole being in parallel with one of said reactances of same sign connected across one of said pairs of terminals of all other quadripoles of the circuit.

15. A circuit according to claim 14 wherein said reactances connected in parallel are replaced by a reactance whose reciprocal is equal to the sum of the respective reciprocals of said reactances.

16. In a voltage transformer device, for providing from at least one alternating voltage having a given frequency at least one other voltage of the same frequency by performance on said first-named voltage of at least one such operation as addition, subtraction, multiplication, division, a circuit comprising at least two quadripoles having each two external and two internal terminals and reactive elements of opposite signs, a reactive element of one sign being directly connected across the external terminals and reactive elements of the other sign being directly connected between an internal terminal and an external terminal, two common terminals to which said two internal terminals of all the quadripoles are respectively connected, a common reactive element of said one sign connected across said common terminals, each quadripole forming a series resonant circuit with its internal terminals shorted, and said circuit being series resonant with the external terminals of each quadripole shorted.

17. In a voltage transformer device, for providing from at least one alternating voltage having a given frequency at least one other voltage of the same frequency by performance on said first-named voltage of at least one such operation as addition, subtraction, multiplication, division, a circuit comprising at least two quadripoles, each quadripole comprising two pairs of terminals and reactances of opposite signs, two reactances of one sign being respectively directly connected across the terminals of each of said pairs and reactances of the other sign being respectively directly connected between two terminals of different pairs, the reactances of each quadripole being series resonant with one of said pairs of terminals shorted, one of said reactances connected across one of said pairs of terminals of each quadripole being in parallel with one of said reactances connected across one of said pairs of terminals of all the other quadripoles of the circuit.

18. A circuit according to claim 17 wherein said reactances connected in parallel are replaced by a reactance whose reciprocal is equal to the sum of the respective reciprocals of said reactances.

References Cited in the file of this patent

UNITED STATES PATENTS

| | | |
|---|---|---|
| 2,067,443 | Gewertz | Jan. 12, 1937 |
| 2,067,444 | Gewertz | Jan. 12, 1937 |

FOREIGN PATENTS

| | | |
|---|---|---|
| 221,984 | Switzerland | June 30, 1942 |
| 520,228 | Great Britain | Apr. 18, 1940 |

OTHER REFERENCES

"Communication Engineering," W. E. Everitt, 2nd edition; McGraw-Hill Book Co., Inc., 1937; pp. 40, 183 and 284.

"Radio Engineers' Handbook," F. E. Terman, 1st edition; McGraw-Hill Book Co., Inc., 1943; pp. 210, 238–244 and 248.

Many and Meiboom: An Electrical Network for Determining the Eigenvalues and Eigenvertors of a Real Symmetric Matrix. The Review of Scientific Instruments, vol. 18, No. 1, November 1947; pp. 831–836, Fig. 4.

"Electric Circuit Models for the Vibration Spectrum of Polyatomic Molecules." (Kron) The Journal of Chemical Physics, vol. 14, No. 1, January 1946, pages 19–31.